United States Patent
Sareen et al.

(10) Patent No.: US 10,607,041 B2
(45) Date of Patent: Mar. 31, 2020

(54) REINFORCEMENT LEARNING BASED DOCUMENT SCANNER

(71) Applicant: Bank of America Corporation, Charlotte, NC (US)

(72) Inventors: Amit Sareen, Hyderabad (IN); Awadhesh Pratap Singh, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 268 days.

(21) Appl. No.: 15/805,300

(22) Filed: Nov. 7, 2017

(65) Prior Publication Data

US 2019/0138592 A1    May 9, 2019

(51) Int. Cl.
| | |
|---|---|
| *G06F 17/00* | (2019.01) |
| *G06F 40/232* | (2020.01) |
| *H04N 1/00* | (2006.01) |
| *G06F 3/0482* | (2013.01) |
| *G06K 9/62* | (2006.01) |
| *G06F 21/32* | (2013.01) |

(Continued)

(52) U.S. Cl.
CPC .......... *G06F 40/232* (2020.01); *G06F 3/0482* (2013.01); *G06F 16/93* (2019.01); *G06F 21/32* (2013.01); *G06F 21/608* (2013.01); *G06K 9/6218* (2013.01); *G06K 9/6286* (2013.01); *G06N 20/00* (2019.01); *H04N 1/00339* (2013.01)

(58) Field of Classification Search
CPC ...... G06F 16/35; G06F 21/32; G06K 2209/01
See application file for complete search history.

(56) References Cited

U.S. PATENT DOCUMENTS 9,002,848 B1 * 4/2015 Peng ............... G06F 16/355
                                                                707/737
9,053,350 B1 * 6/2015 Abdulkader ........... G06K 9/033
(Continued)

OTHER PUBLICATIONS

Reinforcement Learning, Wikipedia, retrieved from https://en.wikipedia.org/wiki/Reinforcement_learning, captured Oct. 20, 2017, 11 pages.*

*Primary Examiner* — Scott T Baderman
*Assistant Examiner* — Barbara M Level
(74) *Attorney, Agent, or Firm* — Weiss & Arons LLP; Michael A. Springs, Esq.

(57) ABSTRACT

Apparatus and methods for transformation of a digital scanner image using machine-learning algorithms are provided. The apparatus and methods may include a portable USB device configured for connection to a scanner port. The device may access and store a scanned digital image captured by the scanner. A device processor may use OCR to generate an editable PDF file and use one or more machine-learning algorithms to apply auto-corrections to the PDF file. The processor may communicate with a user interface configured to display each line from the scanned digital image in line with the corresponding auto-corrected text. The user interface may receive separate inputs accepting each line of auto-corrected text. Auto-correction acceptance data may be transmitted to the device processor. Each accepted auto-correction may be associated with a quantified value. A machine-learning algorithm may be configured to maximize a total value for auto-corrections in a scanned document.

19 Claims, 5 Drawing Sheets

(51) Int. Cl.
*G06N 20/00* (2019.01)
*G06F 16/93* (2019.01)
*G06F 21/60* (2013.01)

(56) References Cited

U.S. PATENT DOCUMENTS

| | | |
|---|---|---|
| 9,213,910 B2 | 12/2015 | Burry et al. |
| 2006/0204047 A1* | 9/2006 | Dave .................. G06F 21/32 |
| | | 382/115 |
| 2007/0255918 A1* | 11/2007 | Suzuki ............ G11B 20/00086 |
| | | 711/163 |
| 2009/0015875 A1* | 1/2009 | Poor ................ H04N 1/00236 |
| | | 358/403 |
| 2014/0173406 A1* | 6/2014 | Robelin ............... G06F 17/276 |
| | | 715/224 |
| 2015/0310068 A1 | 10/2015 | Pickens et al. |
| 2017/0337181 A1* | 11/2017 | Belov ................. G06F 3/0481 |

* cited by examiner

| Scanned Copy | SmartScan Transformation |
|---|---|
| 1. The line is in both files. | 1. The line is only in Text1.txt. |
| 2. The line is in both files. | 2. The line is only in Text1.txt. |
| 3. The line is in both files. | 3. The line is only in Text1.txt. |
| 4. | 4. |
| 5. The line is in both files. | 5. The line is in both files. |
| 6. The line is in both files. | 6. The line is in both files. |
| 7. The line is in both files. | 7. The line is in both files. |
| 8. | 8. |
|     The line is in both files. | |
|     The line is in both files. | |
|     The line is in both files. | |
| 9. The line is in both files. | 9. The line is in both files. |
| 10. The line is in both files. | 10. The line is in both files. |
| 11. The line is in both files. | 11. The line is in both files. |
| 12. The line is in both files. | 12. |
| 13. | 13. The line has been modified between the files. |
| 14. The line is in both files. | 14. The line has been modified between the files. |
| 15. The line is in both files. | 15. The line has been modified between the files. |
| 16. | 16. |
| 17. The line is in both files. | 17. The line is in both files. |
| 18. The line is in both files. | 18. The line is in both files. |
| 19. The line is in both files. | 19. The line is in both files. |
| 20. | 20. |
| 21. The line is in both files. | 21. The line differs only in whitespace. Whether |
| 22. The line is in both files. | 22. differences are highlighted depends on how the application |
| 23. The line is in both files. | 23. is configured. |
| 24. The line is in both files. | 24.   Space at start of line is Text2.txt. |
| 25. The line is in both files. | 25. txt at start of line is Text2.txt. |
| 26. The line is in both files. | 26. Space and text within the line is Text2.txt. |
| 27. | 27. |

REINFORCEMENT LEARNING BASED DOCUMENT SCANNER

FIELD OF TECHNOLOGY

This disclosure relates to an intelligent scanner device. In particular, the disclosure relates to a device configured to enhance machine-readable text generated from a digital scanner image using a series of reinforcement-learning algorithms.

BACKGROUND

Computer processing of a paper document may entail creation of a digital image of the document and conversion of the digital image to machine-readable text. A printer or scanner may generate the digital image of the paper document.

Conventionally, optical character recognition (OCR) software is used to render the digital image into machine-readable text. However, conventional OCR is typically unreliable with regard to irregular character forms. For example, conventional OCR typically produces sub-optimal results when deciphering business logos, handwritten text, blurred text, unusual or script-type fonts, or mathematical formulas.

Conventional scanners and OCR software may rely on feature detection and do not typically incorporate pattern recognition. Further, conventional processing of a digital image typically does not include machine-learning that incorporates user feedback regarding individual auto-corrections.

It would be desirable therefore, to provide machine-learning algorithms for transformation of both standard and non-standard digital images to auto-corrected machine-readable text. It would be desirable to package these algorithms in a portable device that is compatible with an existing scanner and to coordinate with a user interface to receive ongoing feedback.

SUMMARY OF THE DISCLOSURE

Apparatus and methods for transformation of a digital scanner image using machine-learning algorithms are provided.

The apparatus and methods may include a portable USB device configured for connection to a scanner port.

The portable USB device may include a driver configured to access a scanned digital image captured by the scanner and store the image in machine-readable memory.

The portable USB device may include a processor configured to transform the digital image. The device processor may use OCR to generate an editable PDF (portable document format) file. The device processor may use one or more machine-learning algorithms to apply auto-corrections to the PDF file. The device processor may communicate with a remote user interface.

The user interface may be configured to display each line from the scanned digital image in line with the auto-corrected text. The user interface may be configured to receive an input from a user accepting an auto-correction. A user may enter separate inputs for each line of auto-corrected text. Auto-correction acceptance data may be transmitted to the device processor.

The processor may determine a quantified value for each accepted auto-correction. The machine-learning algorithm may be modified to maximize the total value of the auto-corrections for future transformations.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 4 shows an illustrative screenshot in accordance with principles of the invention.

DETAILED DESCRIPTION

Apparatus and methods for transformation of a digital scanner image using a series of machine-learning algorithms are provided.

The apparatus and methods may include a device configured to connect to an existing scanner. The device may be referred to as a "SmartScan device." The SmartScan device may be a portable hardware device.

The SmartScan device may include a power supply. The SmartScan device may include multiple power supply options. The SmartScan device may include a battery. The device may include a power adapter. The SmartScan device may include a USB charging cable or micro-USB charging cable.

The SmartScan device may include a Universal Serial Bus ("USB") connector plug. The USB plug may be compatible with a standard USB port. The USB plug may be a Standard A connector or any other suitable connector. The USB connector may support any suitable USB version including, but not limited to, USB 1.1, 2.0 and 3.0. The USB plug may be inserted into a USB port of a scanner or printer. The portability of the SmartScan device allows a conventional scanner or printer to be converted into an advanced tool for generating enhanced machine-readable text from a paper document.

Biometric authentication may protect against misappropriation of the portable USB device. One or more authorized users of the device may be required to provide biometric data for reference. The biometric data may be fingerprint data or any other suitable biometric data. Biometric data for authorized users of the device may be stored in a SmartScan database. The database may be a component of the SmartScan device. The database may be a remote database accessible by the SmartScan device.

The SmartScan device may include a biometric sensor. The biometric sensor may be a fingerprint sensor or any other suitable sensor. The SmartScan device may be configured to authenticate a user based on data obtained by the biometric sensor. The data obtained by the biometric sensor may be compared to stored biometric data. The SmartScan device may be configured to require biometric authentication prior to installation onto a scanner. The SmartScan device may be configured to require biometric authentication prior to accessing a scanned digital image. The SmartScan device may be configured to require biometric authentication prior to transformation of the digital image, or at any point in the processing of the digital image.

If the SmartScan device does not recognize the fingerprint scan, an alarm may be triggered. In some embodiments, in response to an unrecognized fingerprint scan, the SmartScan device may be deactivated for a pre-determined period of time.

The SmartScan device may include device drivers. A SmartScan device driver may communicate with a scanner driver.

The SmartScan device may include a non-transitory machine-readable memory. The memory may store a digital image retrieved from a scanner. The memory may store machine-readable text generated from the digital image, user feedback data or any other suitable data. The non-transitory machine-readable memory may store computer executable instructions. The SmartScan device may store data in a database. The database may be a component of the SmartScan device. The database may be a remote database accessible by the SmartScan device.

The SmartScan device may include a processor configured to execute the computer executable instructions. For example, a processor circuit may be embedded in an integrated circuit board of the SmartScan device. The processor may control overall operation of the SmartScan device and its associated components.

Computer executable instructions such as software applications may be stored within the non-transitory memory and/or other storage media. The software may provide instructions to the processor that enable the SmartScan device to perform various functions. For example, the non-transitory memory may store software used by the SmartScan device, such as an operating system, application programs, and one or more databases. Application programs may utilize one or more machine-learning algorithms. The machine-learning algorithms may be encapsulated as an executable program (file extension .exe) or a library (file extension .dll). Alternatively, some or all of computer executable instructions of the SmartScan device may be embodied in hardware or firmware components of the device.

The SmartScan device may include communication capabilities. The SmartScan device may operate in a networked environment. For example, the SmartScan device may support network connections to other systems and to patch servers storing software patches. The SmartScan device may support establishing network connections to one or more remote computers. Such remote computers may be nodes on a network. The nodes may be personal computers or servers that include many or all of the elements described above relative to the SmartScan device. Network nodes may be portable devices such as a laptop, a tablet, chat-bot, a smartphone or any other suitable device for receiving, storing, transmitting and/or displaying relevant information.

The network connections may include a local area network ("LAN") and a wide area network ("WAN"), and may also include other networks. When used in a LAN networking environment, the SmartScan device may be connected to the LAN through a network interface or adapter. The communication circuit may include the network interface or adapter.

When used in a WAN networking environment, the SmartScan device may include a modem or other means for establishing communications over a WAN, such as the Internet. It will be appreciated that the existence of any of various well-known protocols such as TCP/IP, Ethernet, FTP, HTTP and the like is presumed.

The SmartScan device may transfer data using near field communication (NFC). The SmartScan device may include Bluetooth connectivity. The SmartScan device may include advanced audio distribution profile support for audio streaming to a Bluetooth headset. The SmartScan device may include an audio/video remote control profile for voice control of connected devices.

In an exemplary embodiment, a user may plug a SmartScan device into the USB port of a scanner. The scanner may generate a digital image from a paper document. The SmartScan device may retrieve the digital image by communicating with the scanner or printer drivers. A SmartScan device driver may communicate with the scanner driver. The SmartScan device may store the digital image in machine-readable memory.

The SmartScan device may generate machine-readable text from the scanned digital image. The SmartScan device may use OCR or any suitable method to convert the digital image to a Portable Document Format (PDF) document. The PDF may be an Adobe PDF, designed by Adobe Systems Incorporated, of San Jose, Calif. The PDF may be an editable PDF.

The SmartScan device may apply one or more machine-learning algorithms to the text of the PDF document. An algorithm may process a word or phrase from the PDF as an input and present auto-corrected text as output. In some embodiments, a plurality of machine-learning algorithms may sequentially provide layers of auto-correction.

The machine-learning algorithm may be a supervised learning algorithm. The machine-learning algorithm may be a semi-supervised learning algorithm. The machine-learning algorithm may be a classification algorithm. In some embodiments, the classification algorithm may be a first-level algorithm.

The SmartScan device classification algorithm may use pattern recognition to identify a data type for a segment of text. Pre-defined rules may be applied to correlate an input with a labeled dataset. For example, classification may be applied to identify a company name, an account number, or a company logo. In an illustrative example, a rule may state that all company names must be part of a database. If the text includes a company name that is not in the database, the algorithm may apply an auto-correction. Labeled datasets and rules may be stored in a SmartScan database. The SmartScan database may be a component of the SmartScan device. The database may be a remote database accessible by the SmartScan device.

SmartScan device pattern recognition for quantitative values may rely on linear classifier techniques or any other suitable classification algorithms. SmartScan device pattern recognition for complex scenarios such as pictures, may rely on support vector machines (SVM) or any other suitable classification algorithm. Based on the labeled datasets, the SVM may identify the ideal classification for the data type corresponding to the input. The SVM may use a training algorithm to build models for classification.

In some embodiments a machine-learning algorithm may be an unsupervised learning algorithm. The unsupervised learning algorithm may be a clustering algorithm. In some embodiments, the clustering algorithm may be a second-level algorithm.

The SmartScan clustering algorithm may be applied in a case where data from the scanned document does not correspond to a labeled dataset. The clustering algorithm may detect a similarity to one or more previously-scanned documents. The clustering algorithm may detect a difference from one or more previously-scanned documents. The clustering algorithm may attempt to determine natural clustering of data from previously-scanned documents into groups and then map new data to these groups. Previously scanned documents may be stored in a SmartScan database. The SmartScan database may be a component of the SmartScan device. The SmartScan database may be a remote database accessible by the SmartScan device.

The SmartScan device may apply exclusive clustering techniques to eliminate impossible groupings. Exclusive clustering may be referred to as mutually exclusive clustering. For example, a rule may state that an account number is restricted to numeric characters only. A run of alphabetic characters appearing immediately after an account number may be determined to define the end of the account number because these characters are excluded from any account number dataset.

Probabilistic clustering techniques may be applied to predict the correct text based on a similarity to stored text. An illustrative example involves blurred text that does not correspond to a known dataset format such as an account number or company name. When a digital image includes blurred text, probabilistic clustering may be applied to suggest the most likely version of each word. In some cases, probabilistic clustering may rely on context. For example, if stored documents show that a single character appearing on the bottom center of the page is routinely a numeric character, a single character appearing at the bottom of the page in the blurred text may be interpreted as a number.

In some embodiments, a machine-learning algorithm may apply regression techniques to detect a fraudulent document. The algorithm may include K-nearest neighbor signature matching. The algorithm may use local outlier factor techniques.

The SmartScan device fraud detection algorithm may compare the scanned document to a stored document of the same type. The algorithm may detect formatting in the scanned document that does not match the format of the stored document. The algorithm may detect a misalignment within the scanned document. The algorithm may detect an attempt to superimpose one document over another. The algorithm may highlight or otherwise identify a suspect section of the scanned document for further investigation.

Based on the machine-learning algorithms, the SmartScan device may auto-correct the text of the PDF file generated from the digital image. The SmartScan device may store the auto-corrected text in machine-readable memory.

The SmartScan device may display the auto-corrected text in a user interface. The user interface may be displayed on a screen of a remote computing device. The computing device may be a desktop computer, a laptop computer, a tablet, a mobile phone or any other suitable device.

The SmartScan device may communicate with user interface software. The user interface software may be stand-alone software. The user interface software may be pre-loaded on a computing device. The user interface software may be pre-loaded from a CD or a USB drive, or installed via any other suitable method. In some embodiments, the interface may be accessed via the worldwide web and may be loaded via an internet connection. In some embodiments, the user interface may be a browser-based user interface.

The auto-corrected text may be electronically transmitted to the user interface. The SmartScan device may communicate with the user interface via NFC. NFC may be used without a network connection. In some embodiments, NFC may be restricted to trusted network devices. The SmartScan device may communicate with the user interface via a wireless network. In some embodiments, the SmartScan device may be connected to a USB port of the remote computing device. In some embodiments, the SmartScan device may be connected to the remote computing device with a micro USB cable or any suitable connector.

The user interface may be configured to present auto-corrected text to a user. The user interface may display a line-by-line comparison of the scanned digital image and the auto-corrected text. The user interface may display a line from the scanned digital image alongside a corresponding line from the auto-corrected text. The SmartScan device may include a matching algorithm to ensure that each line from the scanned digital image is correctly aligned with the corresponding line from the auto-corrected text.

The user interface may be configured to receive input from a user. The user interface may be configured to receive separate inputs confirming acceptance of each line of auto-corrected text. The user interface may include a checkbox associated with each line of the auto-corrected text. An input may include inserting a check or alternate symbol in the checkbox. An input may be referred to as "checking" the checkbox. Input in a checkbox may indicate acceptance of the auto-correction. A checkbox with no input may indicate that the auto-correction is not accepted.

The SmartScan device machine-learning algorithms may incorporate reinforcement learning. The reinforcement learning may be goal-oriented learning. The SmartScan device may learn a sequence of actions that will lead it to achieve a goal, in this case, accurate auto-correction. An accepted auto-correction may be associated with a quantitative value. One or more of the machine-learning algorithms may be modified based on the quantitative values. The machine-learning algorithms may be configured to maximize the total quantitative value for a document.

In some embodiments, an accepted auto-correction may be awarded a pre-determined number of reward points. The machine-learning algorithm may be configured to maximize the total number of reward points for auto-correction of a document.

The SmartScan device may store acceptance data, quantitative values corresponding to acceptance data, reward points, and any other suitable type of user feedback in a SmartScan database. The SmartScan database may be a component of the SmartScan device. The SmartScan database may be a remote database accessible by the SmartScan device.

In some embodiments, a SmartScan device machine-learning algorithm may be configured to apply the acceptance data received regarding the most recent auto-correction.

In some embodiments, a SmartScan device machine-learning algorithm may be configured to apply the acceptance data most frequently received regarding a specific type of auto-correction over a pre-determined time period. For example, if an auto-correction was accepted six times out of ten for the given time period, the machine-learning algorithm may determine that, on average, the auto-correction is acceptable. The SmartScan device may apply the auto-correction the next time similar text appears in a scanned document.

The checkboxes in the user interface may be displayed in an unchecked state. The checkboxes may be in an unchecked state at the time an auto-correction is first displayed. A user may check the box to indicate acceptance of the auto-correction. Subsequently, when an auto-correction similar to the accepted auto-correction is displayed, the corresponding checkbox may be pre-checked for the user. The user may remove the check to indicate that the auto-correction is not accepted. The user input may be referred to as "unchecking" a checkbox.

The user interface may include a button for confirming the checkbox inputs. In these embodiments, the checkbox inputs may not take effect until after the user has activated the button. A confirmation button may allow the user to reconsider and modify acceptance inputs before submitting the acceptance data to the SmartScan device. Upon submission of the acceptance data, the auto-corrected text may be modified to reflect auto-corrections that have been accepted and auto-corrections that have not been accepted. Upon submission of the acceptance data, one or more machine-learning algorithms may be modified based on the acceptance data.

The SmartScan device may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The SmartScan device may utilize computer-executable instructions, such as program modules, executed by a computer. Generally, program modules include routines, programs, objects, components, data structures, etc. that perform particular tasks or implement particular data types. The SmartScan device may be operational with distributed computing environments where tasks are performed by remote processing devices that are linked through a communications network. In a distributed computing environment, program modules may be located in both local and remote computer storage media including memory storage devices.

A device that accesses the SmartScan device may include one or more features of the SmartScan device. For example, an accessing device may be a smart phone, desktop computer or other device. The accessing device may be operated by an authorized user of the SmartScan device, a network administrator or any other suitable party.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
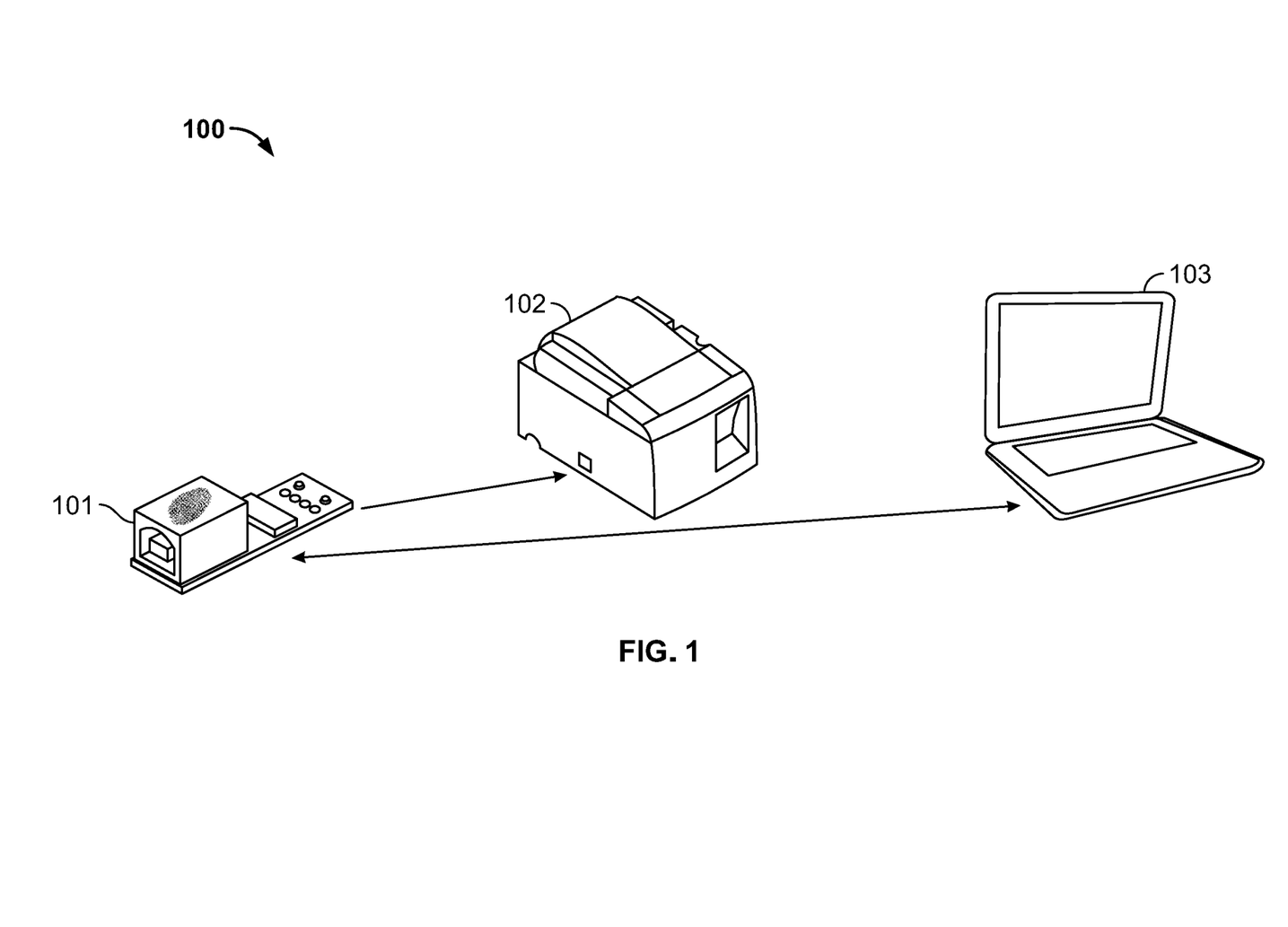
FIG. 1 shows an illustrative arrangement in accordance with principles of the invention.

FIG. 1 shows illustrative arrangement 100. SmartScan device 101 may be inserted into the USB port of scanner 102. SmartScan device 101 may be in wireless communication with laptop computer 103. Laptop computer 103 may display a user interface configured to present auto-corrected text and receive a user input accepting an auto-correction.

Figure 2:
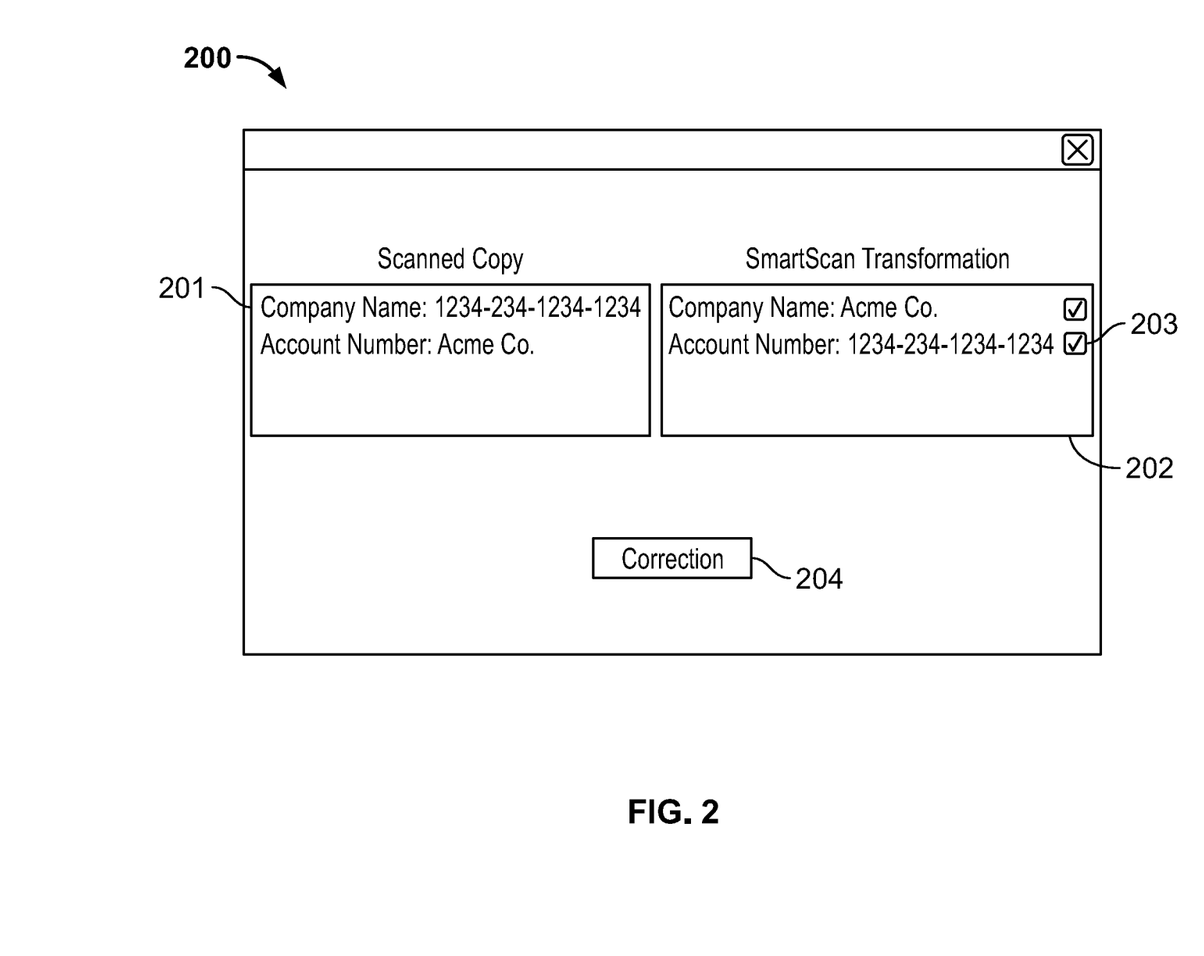
FIG. 2 shows an illustrative screenshot in accordance with principles of the invention.

FIG. 2 shows illustrative screenshot 200. Screenshot 200 may be presented in a user interface. Screenshot 200 may include lines from scanned digital image 201. Screenshot 200 may include auto-corrected text 202. Each line of auto-corrected text 202 may be presented alongside the corresponding text from scanned digital image 201.

In screenshot 200, the original scanned document mistakenly transposed the company name and the account number. Based on the numerical characters and formatting, a SmartScan device classification algorithm may recognize that the company name shown is actually an account number. Based on a match to a labeled dataset of company names, the classification algorithm may determine that the account number shown is actually a company name. The SmartScan processor may auto-correct the document by moving the company name and the account number to the correct spots.

Screenshot 200 may include checkbox 203. Checkbox 203 may be configured to receive an acceptance of an auto-correction. A user may check checkbox 203 to indicate acceptance of the auto-correction. The user may check checkbox 203 to indicate acceptance of an auto-correction. The user may activate correction button 204 to submit acceptance of the auto-correction. Acceptance data may be transmitted to the SmartScan device. Acceptance data may be stored in a SmartScan device database. Acceptance data may be applied to modify one or more machine-learning algorithms.

Figure 3:
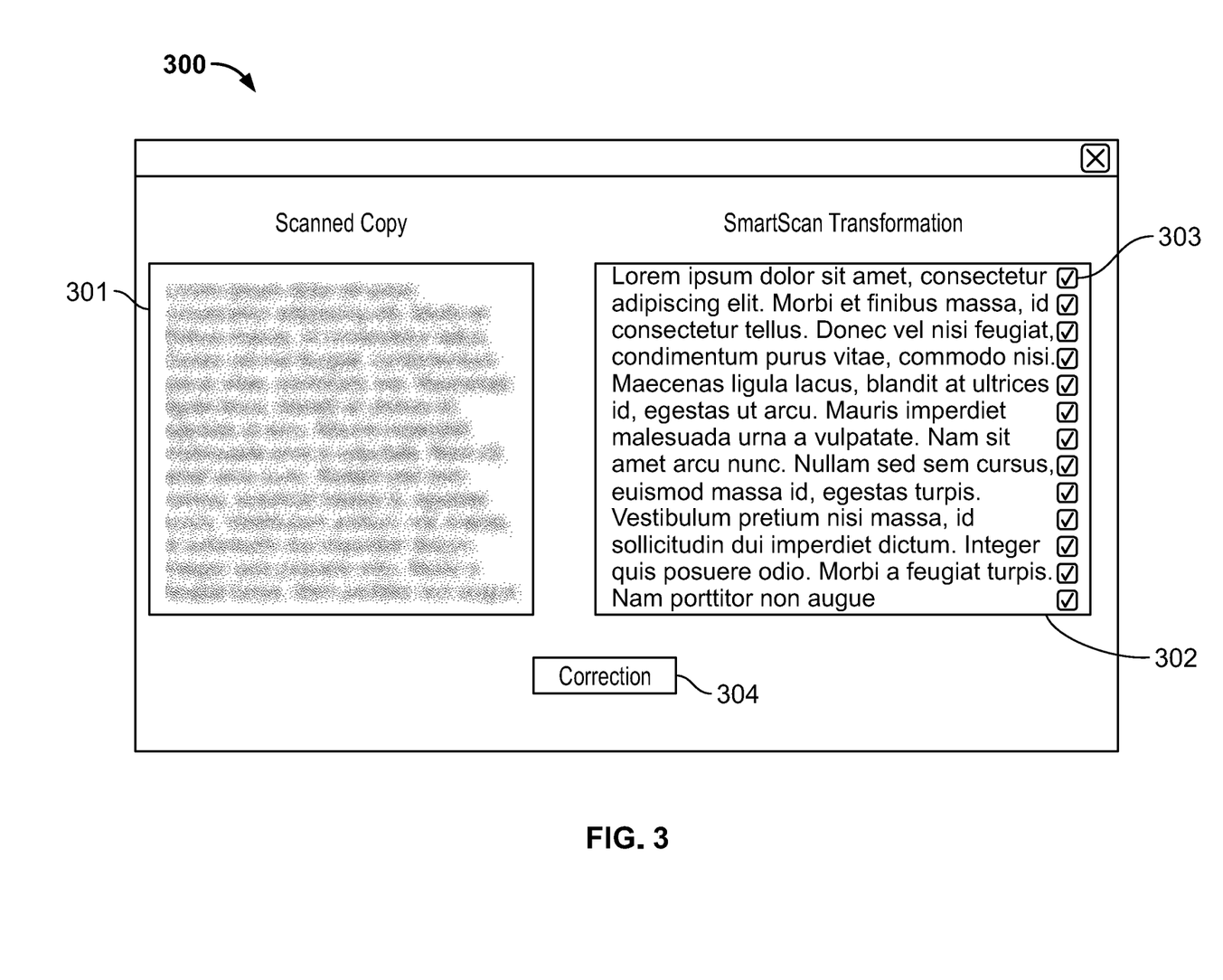
FIG. 3 shows an illustrative screenshot in accordance with principles of the invention.

FIG. 3 shows illustrative screenshot 300. Screenshot 300 may be presented in a user interface. Screenshot 300 may include lines from scanned digital image 301. Screenshot 300 may include auto-corrected text 302. Each line of auto-corrected text 302 may be presented alongside the corresponding text from scanned digital image 301.

In screenshot 300, scanned digital image 301 includes blurred text. A clustering algorithm may be applied to generate the auto-corrected text.

Screenshot 300 may include checkbox 303. Checkbox 303 may be configured to receive an acceptance of an auto-correction. A user may check checkbox 303 to indicate acceptance of the auto-correction.

The user may activate correction button 304 to submit acceptance of the auto-correction. Acceptance data may be transmitted to the SmartScan device. Acceptance data may be stored in a SmartScan device database. Acceptance data may be applied to modify a machine-learning algorithm.

FIG. 4 shows illustrative screenshot 400. Screenshot 400 may be presented in a user interface. Screenshot 400 may show data associated with scanned digital image in column 401. The SmartScan device may include a fraud detection algorithm. The fraud detection algorithm may detect differences between scanned image 401 and stored documents of a similar type. Screenshot 400 may present the differences in column 402. The differences may be based on formatting of the scanned document. The differences may be based on the alignment of portions of the scanned document. Screenshot 400 may highlight, underline, or otherwise flag differences between the two documents.

Figure 5:
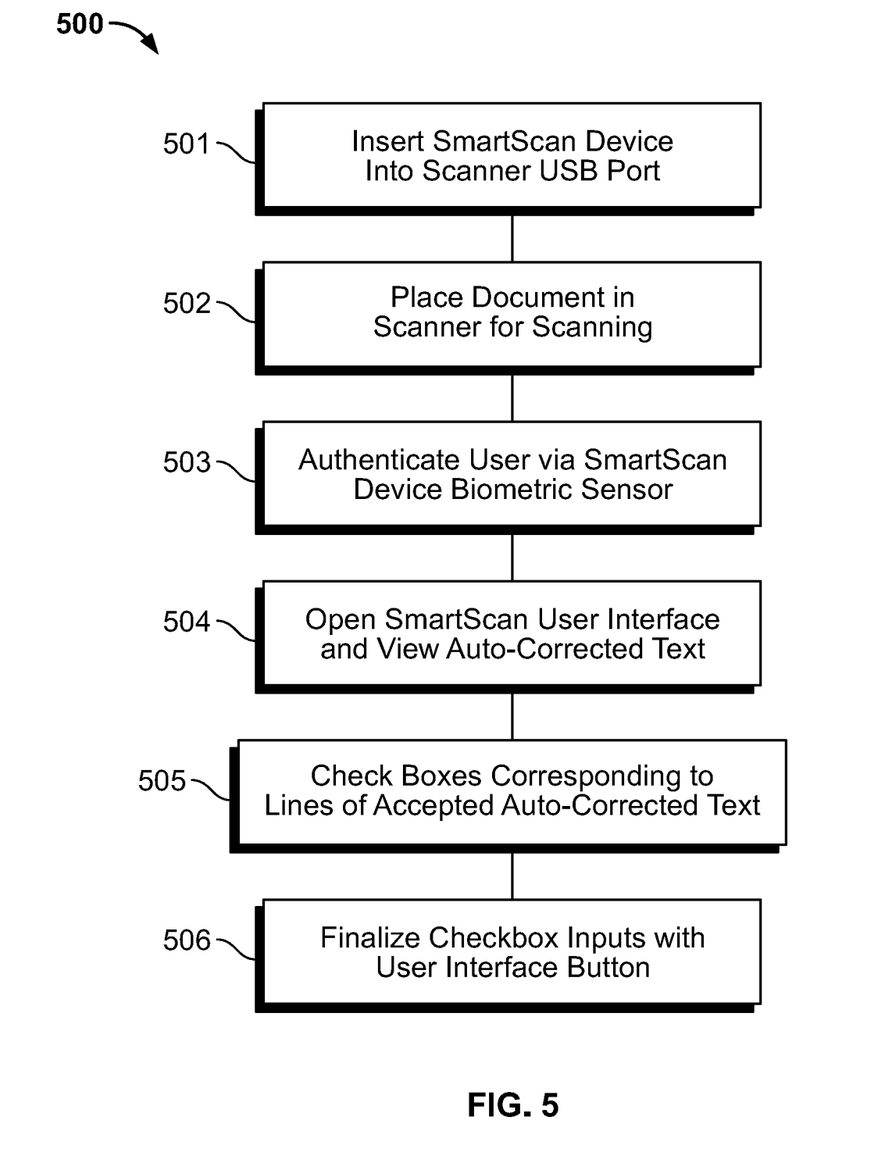
FIG. 5 shows an illustrative process flow in accordance with principles of the invention.

FIG. 5 shows illustrative process flow 500. Process flow 500 focuses on actions involving a device user. At step 501, a user may insert the SmartScan device into the USB port of a scanner. At step 502, the user scans a document. At step 503, a user is authenticated by the SmartScan device based on data obtained by a biometric sensor included in the device. At step 504, the user views auto-corrected text generated from the scanned image in a user interface. At step 505, the user enters an input accepting an auto-correction. At step 506, the user finalizes the inputs by engaging a user interface button for submission of auto-correction acceptance data. The auto-correction acceptance data may be applied to the reinforcement-learning algorithms to improve subsequent transformations.

Thus, apparatus and methods for a reinforcement-learning based document scanner are provided. Persons skilled in the art will appreciate that the present invention can be practiced by other than the described embodiments, which are presented for purposes of illustration rather than of limitation. The present invention is limited only by the claims that follow.

What is claimed is:

1. A portable USB device for performing machine-learning based transformation of a digital scanner image, the device comprising:
 a biometric sensor configured to detect biometric data associated with a device user;
 a USB connector configured to be connected to a port of a scanning device;
 a device driver in communication with a connected scanning device, the device driver configured to access a digital image of a paper document;
 a memory drive configured to store the digital image of the paper document in non-transitory machine-readable memory; and
 a processor configured to:
  determine, based on the biometric data, that a device user is an authorized device user;
  transform the digital image, the transformation comprising auto-correction of machine-readable text generated from the digital image, the auto-correction based on one or more machine-learning algorithms;
  display in a remote graphical user interface:
   a line of text from the digital image in line with corresponding auto-corrected text; and
   a checkbox in line with the line of auto-corrected text, the checkbox configured to receive an input accepting the auto-correction;
  determine a quantified value corresponding to each accepted auto-correction; and
  modify one or more of the machine-learning algorithms to apply a set of auto-corrections that maximizes a sum of the corresponding quantified values.

2. The device of claim 1, wherein the USB device is a first device and the graphical user interface is displayed on a screen of a second device.

3. The device of claim 1, wherein the one or more machine-learning algorithms comprises a machine-learning algorithm configured to apply linear classification to auto-correct a text input that corresponds to a labeled dataset.

4. The device of claim 1, wherein the one or more machine-learning algorithms comprises a machine-learning algorithm configured to auto-correct a text input comprising unlabeled data using exclusive and/or probabilistic clustering.

5. The device of claim 1, wherein the processor is further configured to apply a matching algorithm to correct a horizontal linear alignment of each line of auto-corrected text with respect to each line of the scanned digital image.

6. The device of claim 1, wherein the one or more checkboxes displayed in the graphical user interface are pre-checked based on stored auto-correction acceptance inputs.

7. The device of claim 6, wherein the one or more checkboxes are pre-checked based on the most recently accepted auto-correction.

8. The device of claim 6, wherein the one or more checkboxes are pre-checked based on cumulative auto-correction acceptance inputs, the auto-corrections accepted over a pre-determined time period.

9. One or more non-transitory computer-readable media storing computer-executable instructions which, when executed by a USB processor, perform a method for auto-correcting machine-readable text generated from a digital image, the USB processor residing in a hand-held USB device, the method comprising:
 receiving a scanned digital image of a paper document from a scanner connected to the USB device and storing the digital image in a USB memory drive;
 generating machine-readable text from the scanned digital image and storing the machine-readable text in the USB memory drive;
 auto-correcting the machine-readable text based on one or more machine-learning algorithms and storing the auto-corrected text in the USB memory drive;
 displaying in a graphical user interface:
  a line of text from the digital image in line with the corresponding auto-corrected text;
  a plurality of checkboxes, each checkbox in line with a line of auto-corrected text, the checkboxes configured to receive an input accepting the auto-correction;
 quantifying a value corresponding to an accepted auto-correction; and
 modifying an auto-correction algorithm to maximize a sum of the quantified values corresponding to a set of auto-corrections.

10. The media of claim 9 wherein the USB device is a first device and the graphical user interface is displayed on a screen of a second device.

11. The media of claim 9, wherein the one or more machine-learning algorithms comprises a machine-learning algorithm configured to apply linear classification to auto-correct machine-readable text corresponding to a labeled dataset.

12. The media of claim 9, wherein the one or more machine-learning algorithms comprises a machine-learning algorithm configured to auto-correct machine-readable text comprising unlabeled data using exclusive and/or probabilistic clustering.

13. The media of claim 9, wherein the method further comprises applying a matching algorithm to correct the horizontal linear alignment of a line of auto-corrected text with respect to a corresponding line of the scanned digital image.

14. The media of claim 9, wherein one or more checkboxes displayed in the graphical user interface are pre-checked based on stored auto-correction acceptance data.

15. The media of claim 14, wherein the one or more checkboxes are pre-checked based on the most recently accepted auto-correction.

16. The media of claim 14, wherein the one or more checkboxes are pre-checked based on cumulative auto-correction acceptance data received over a pre-determined time period.

17. A USB device for performing machine-learning based enhancement of machine-readable text derived from a digital image, the device comprising:
- a USB connector configured to connect to a scanner port;
- a device driver in communication with the scanner, the device driver configured to access a scanned digital image of a paper document;
- a processor configured to:
  - apply a first-stage transformation to the scanned digital image of the paper document, the first-stage transformation comprising conversion of the digital image to machine-readable text using optical character recognition;
  - apply a second-stage transformation to the machine-readable text, the second-stage transformation comprising auto-correction of the machine-readable text using one or more reinforcement-learning algorithms;
- a transmitter configured to communicate with a remote graphical user interface, the graphical user interface configured to display:
  - a line from the scanned digital image in line with corresponding auto-corrected text; and
  - a checkbox in-line with the line of auto-corrected text, each checkbox configured to receive an input accepting the auto-correction; and
- a memory drive configured to store in non-transitory machine-readable memory:
  - the digital image of the paper document;
  - the auto-corrected machine-readable text; and
  - one or more inputs accepting an auto-correction;

wherein the processor is further configured to modify one or more of the reinforcement-learning algorithms based on the one or more inputs accepting the auto-corrections.

18. The device of claim 17, wherein the USB device is a first device and the graphical user interface is displayed on a screen of a second device.

19. The device of claim 17, further comprising a biometric sensor configured to detect biometric data associated with a device user, wherein the processor is further configured to, based on the biometric data, determine that a device user is an authorized device user.

\* \* \* \* \*